Patented Apr. 8, 1941

2,237,729

UNITED STATES PATENT OFFICE 2,237,729

CYCLOPENTYL ESTERS OF POLYCARBOXYLIC ACIDS

Theodore W. Evans and James R. Scheibli, Oakland, Calif., assignors to Shell Development Company, San Francisco, Calif., a corporation of Delaware No Drawing. Application February 9, 1940, Serial No. 318,162

11 Claims. (Cl. 260—475)

This invention relates to a novel class of compounds which consists of the cyclopentyl esters of polycarboxylic acids.

Synthetic resins are finding continually expanding use in an increasing variety of applications at the present time and they are now widely employed in surface coatings, moulding compositions, impregnating compositions, and the like. Many of the synthetic resins employed for such purposes are inherently brittle so that when formed into finished articles or coatings, they tend to crack or peel unless some modifying agent is also present. The modifying agents are known as plasticizers and these substances incorporated with the resins impart plasticity, flexibility and extensibility to them. Substances used as plasticizers with resins must however meet certain rigid requirements such as compatibility, low volatility, light stability, water resistance and colorlessness. A few compounds including camphor, tricresyl phosphate, castor oil and dibutyl phthalate have been extensively used as plasticizers, but they have certain properties which are disadvantageous. For example, tricresyl phosphate is not particularly stable against light, especially sunlight, and this defect is quite apparent when this substance is used to plasticize light-colored or transparent resin compositions.

It is an object of the present invention to provide a new class of compounds which are particularly suited for use as resin plasticizers because of low volatility, light stability, colorlessness, and compatibility with resins.

We have found that these desirable properties are possessed by the cyclopentyl esters of polycarboxylic acids. This class of compounds are high boiling substances with low volatility at ordinary temperatures since they are esters of poly rather than monocarboxylic acids. They have excellent compatibility with a large variety of resins owing to the presence of a plurality of ester groups in the molecule and the cyclic character of the cyclopentyl group. Furthermore, they are colorless compounds with the property of being very stable towards light radiation.

Included within the scope of the present invention are the cyclopentyl esters of both aliphatic and aromatic polycarboxylic acids. The aliphatic polycarboxylic acids may be either saturated or unsaturated compounds. Representative members include oxalic acid, malonic acid, succinic acid, glutaric acid, adipic acid, tricarballylic acid, maleic acid, fumaric acid, citraconic acid, mesaconic acid, itaconic acid, glutaconic acid, aconitic acid, phthalic acid, terephthalic acid, trimellitic acid, and their homologues and analogues together with suitably substituted compounds thereof such as malic acid, tartaric acid, citric acid, acetone dicarboxylic acid, diglycollic acid, thiodiglycollic acid, and the like.

The cyclopentyl esters of the invention are neutral esters, i. e. each and all of the carboxylic groups contained in the acids from which they have been derived are esterified. The most preferred group of esters are those wherein all of the carboxylic groups have been esterified with cyclopentanol. It may, however, in some cases be desirable to have part of the carboxylic groups esterified with other alcohols than cyclopentanol so that the compounds are mixed esters. The monohydric alcohols, especially those from the aliphatic series, are preferable for preparing mixed esters with modified properties. Thus, for example, a lower boiling ester of a particular polybasic acid may be desired than the ester wherein all of the carboxylic groups have been esterified with cyclopentanol. This may be realized by esterifying only part of the carboxylic groups with cyclopentanol and esterifying the remaining groups with a lower monohydric alcohol such as methyl alcohol, ethyl alcohol, isopropyl alcohol, allyl alcohol and the like. On the other hand, if a higher boiling ester is required, the remaining carboxylic groups may be esterified with a higher monohydric alcohol such as hexyl alcohol, octyl alcohol, benzyl alcohol and the like. While the properties of the esters may be modified by the presence of groups derived from other monohydric alcohols than cyclopentanol, mixed esters of cyclopentanol may also be prepared from the less preferred polyhydric alcohols such as ethylene glycol, propylene glycol, trimethylene glycol, glycerol, beta methyl glycerol, erythritol and the like. The esters derived from the polyhydric alcohols are very high boiling substances which are useful in special applications. If they are prepared from a cyclopentyl acid ester of a polycarboxylic acid containing a single unesterified carboxylic group, they will be of comparatively simple chemical constitution. If the acid ester contains two or more free carboxylic groups, it is likely that the products will be complex and resinous in character even though they are neutral esters. It is thus seen that any alcohol may be employed to modify the properties of the cyclopentyl esters. In general, the cyclic structure of the esters in which all of the carboxylic groups have been esterified with cyclopentanol are the most desirable although the mixed esters may be advantageous under special circumstances.

The cyclopentyl esters may be prepared in a variety of manners. A polycarboxylic acid may be reacted with cyclopentanol by heating the mixture of reactants in the presence of an esterification catalyst such as sulfuric acid, boric acid, phosphoric acid, benzene sulfonic acid, etc., and removing the water formed by the reaction. Cyclopentanol forms an azeotrope with water and by boiling the reaction mixture containing an excess of cyclopentanol over that theoretically required for reaction with the polybasic acid, the water and the necessary cyclopentanol to form the azeotrope may be distilled from the mixture. If desired, a third agent may be added to the reaction mixture for the purpose of removing the water. The third agent is preferably a substance inert in the reaction mixture with which water azeotropically distills such as benzene, toluene, isooctane, mineral oil fractions, ethylene dichloride, ethers and the like.

Mixed neutral esters may be prepared by esterifying part of the carboxylic groups of a polycarboxylic acid with cyclopentanol and subsequently esterifying any remaining groups with a different alcohol or, if desired, this procedure may be reversed by first partially esterifying the polybasic acid with the dissimilar alcohol and then completing the esterification with cyclopentanol. In preparing the mixed esters, it may be desirable to separate the partially esterified acid ester from the crude reaction mixture for the purpose of obtaining the acid ester in a purified form for subsequent esterification with a different alcohol. The crude reaction mixture from the primary esterification step may, however, be employed without separation of the acid ester contained therein by adding the second alcohol and completing the esterification reactions so as to obtain a neutral ester in this manner. In some cases, the mixed esters may be prepared by employing a mixture of cyclopentanol with one or more different alcohols in order to simultaneously esterify the carboxylic groups of the polycarboxylic acid with cyclopentanol and the other alcohol or alcohols in a single operation.

Besides using a polycarboxylic acid as a reactant in preparing the neutral esters, there may be employed polycarboxylic acid halides such as the chlorides and bromides, polycarboxylic acid anhydrides, and like derivatives. The polycarboxylic acid anhydrides are useful compounds to employ in preparing the mixed esters. For example, a mol of cyclopentanol may be reacted with a mol of the anhydride of a dicarboxylic acid so as to obtain the cyclopentyl acid ester of the acid with no water resulting as a product of reaction. This acid ester may then be further reacted with a different alcohol in order to prepare the neutral mixed ester.

Upon completion of the esterification reaction or reactions, the product may be washed with water to remove the esterification catalyst, or if desired, when an acid-acting catalyst is employed, the catalyst may be neutralized with a basic-acting agent. The neutral ester may be separated from the reaction mixture following the removal or destruction of the catalyst and obtained in a substantially pure form. It is ordinarily most desirable to separate the ester by a distillation operation. Owing to the high boiling point of the cyclopentyl esters of the polycarboxylic acid, the distillation is preferably conducted under subatmospheric pressure at least after unreacted cyclopentanol or other alcohol has been first distilled from the mixture.

The neutral cyclopentyl esters of polycarboxylic acids have better properties as plasticizers than the seemingly closely related corresponding cyclohexyl esters—a fact which is quite surprising and wholly unpredictable. Since the purpose of incorporating a plasticizer with a resin is to give the resin flexibility, the value of a substance as a plasticizer may be measured by the degree of elongation and the tensile strength of a film of the plasticized resin. When nitrocellulose, one of the most widely used synthetic resins, is plasticized with from a few per cent to equal parts of dicyclopentyl adipate, the plasticized resin has higher tensile strength and greater elongation in all proportions within these limits than nitrocellulose plasticized with like amounts of dicyclohexyl adipate. Furthermore, the tensile strength and elongation of nitrocellulose plasticized with dicyclopentyl adipate is greater than this resin plasticized with tricresyl phosphate which is an exceedingly popular substance for plasticizing nitrocellulose. These facts clearly indicate the superiority of the neutral cyclopentyl esters of polycarboxylic acids.

The following examples are given for illustrative purposes only:

Example I

Dicyclopentyl phthalate was prepared by heating about 3.3 mols of cyclopentanol with about 1.1 mols of phthalic anhydride in the presence of approximately 0.3 mol of boric acid. The water formed by the reactions was distilled from the mixture as an azeotrope with the aid of toluene. Upon completion of the reaction, the product was washed with water and purified by vacuum distillation. The dicyclopentyl phthalate which was obtained boiled at about 190° C. under 2.5 mm. pressure and melted at 30° C. Analyses and determination of the physical constants of a sample of the product gave the following results:

|  | Product | Theory |
| --- | --- | --- |
| Density, $d_4^{20}$ | 1.133 (super cooled liquid). |  |
| Carbon | 71.2% | 71.6%. |
| Hydrogen | 7.4% | 7.3%. |
| Saponification value. | 0.65 eq. ester/100 gm | 0.66 eq. ester/100 gm. |

Example II

A mixture consisting of about 2.0 mols of succinic acid and 6.8 mols of cyclopentanol plus approximately 1% of concentrated sulfuric acid was boiled in a still and the water removed substantially as fast as formed. After about five hours the distillate was combined with the reaction mixture and about 400 cc. of water were added thereto. The sulfuric acid was exactly neutralized with aqueous sodium hydroxide and the product extracted from the mixture with diisopropyl ether. Distillation of the extract gave about 450 gm. of dicyclopentyl succinate which boiled at about 118° C. under 1 mm. pressure. Analysis and physical constants of the product follows:

|  | Product | Theory |
| --- | --- | --- |
| Density, $d_4^{20}$ | 1.047 |  |
| Refractive index, $n_d^{20}$ | 1.469 |  |
| Carbon | 66.4% | 66.2%. |
| Hydrogen | 8.9% | 8.7%. |
| Saponification value | 0.79 eq. ester/100 gm | 0.79 eq. ester/100 gm. |

We claim as our invention:

1. Dicyclopentyl succinate.
2. Dicyclopentyl adipate.
3. A neutral cyclopentyl ester of an aliphatic dicarboxylic acid.
4. A neutral cyclopentyl ester of an aliphatic polycarboxylic acid.
5. Dicyclopentyl phthalate.

6. A neutral cyclopentyl ester of an aromatic dicarboxylic acid.

7. A neutral cyclopentyl ester of an aromatic polycarboxylic acid.

8. A neutral ester of a dicarboxylic acid wherein at least one of the carboxylic groups has been esterified with cyclopentanol and any remaining carboxylic groups have been esterified with a monohydric alcohol.

9. A neutral ester of a polycarboxylic acid wherein at least one of the carboxylic groups has been esterified with cyclopentanol and any remaining carboxylic groups have been esterified with a monohydric alcohol.

10. A neutral ester of a dicarboxylic acid wherein at least one of the carboxylic groups has been esterified with cyclopentanol and any remaining carboxylic groups have been esterified with an alcohol.

11. A neutral ester of a polycarboxylic acid wherein at least one of the carboxylic groups has been esterified with cyclopentanol and any remaining carboxylic groups has been esterified with an alcohol.

THEODORE W. EVANS.
JAMES R. SCHEIBLI.